United States Patent
Poursohi et al.

(10) Patent No.: US 9,237,329 B1
(45) Date of Patent: Jan. 12, 2016

(54) SYSTEMS AND METHODS FOR CAPTURING DATA OF AN OBJECT

(71) Applicant: Google Inc., Mountain View, CA (US)

(72) Inventors: Arshan Poursohi, Berkeley, CA (US); Thor Lewis, Jr., San Francisco, CA (US)

(73) Assignee: Google Inc., Mountain View, CA (US)

(*) Notice: Subject to any disclaimer, the term of this patent is extended or adjusted under 35 U.S.C. 154(b) by 164 days.

(21) Appl. No.: 14/053,368

(22) Filed: Oct. 14, 2013

Related U.S. Application Data

(62) Division of application No. 13/655,069, filed on Oct. 18, 2012, now abandoned.

(51) Int. Cl.
 *H04N 13/02* (2006.01)
 *H04N 13/04* (2006.01)
 *H04N 13/00* (2006.01)

(52) U.S. Cl.
 CPC ....... *H04N 13/0203* (2013.01); *H04N 13/0055* (2013.01); *H04N 13/0239* (2013.01); *H04N 13/0242* (2013.01); *H04N 13/0497* (2013.01); *H04N 13/0296* (2013.01)

(58) Field of Classification Search
 CPC .......... H04N 13/0239; H04N 13/0242; H04N 13/0497; H04N 13/0055; H04N 13/0296
 USPC .......................................... 348/46–48, 51, 42
 See application file for complete search history.

(56) References Cited

U.S. PATENT DOCUMENTS

| | | | |
|---|---|---|---|
| 4,320,290 A | 3/1982 | Frosch et al. | |
| 6,081,269 A * | 6/2000 | Quarendon | G06T 17/00 345/419 |
| 2007/0076090 A1 * | 4/2007 | Alexander | G06T 17/00 348/47 |
| 2007/0279415 A1 * | 12/2007 | Sullivan | H04N 13/0275 345/427 |
| 2012/0176478 A1 | 7/2012 | Wang et al. | |
| 2012/0177283 A1 * | 7/2012 | Wang et al. | 382/154 |

* cited by examiner

*Primary Examiner* — Shawn An
(74) *Attorney, Agent, or Firm* — McDermott Boehnen Hulbert & Berghoff LLP

(57) ABSTRACT

Systems and methods for capturing data of an object are provided. In an example system, a suspension component for suspending an object so that the object is stationary in space is provided. A plurality of image capture devices are configured to capture a plurality of images of the object simultaneously while the object is suspended. The plurality of image capture devices are each positioned at a different location so as to capture a plurality of different views of the object. The system is also configured to generate a three-dimensional (3D) view of the object based on the plurality of images and the plurality of different views.

20 Claims, 5 Drawing Sheets

COMPUTER PROGRAM PRODUCT 600

SIGNAL BEARING MEDIUM 601

PROGRAM INSTRUCTIONS 602

- CAPTURING A PLURALITY OF IMAGES OF A SUSPENDED OBJECT SIMULTANEOUSLY WITH A PLURALITY OF IMAGE CAPTURE DEVICES, WHEREIN THE PLURALITY OF IMAGE CAPTURE DEVICES ARE EACH PLACED AT A DIFFERENT LOCATION SO AS TO CAPTURE A PLURALITY OF DIFFERENT VIEWS OF THE OBJECT

- GENERATING A THREE-DIMENSIONAL (3D) VIEW OF THE OBJECT FROM THE PLURALITY OF IMAGES AND THE PLURALITY OF DIFFERENT VIEWS

| COMPUTER READABLE MEDIUM 603 | COMPUTER RECORDABLE MEDIUM 604 | COMMUNICATIONS MEDIUM 605 |

FIGURE 6

SYSTEMS AND METHODS FOR CAPTURING DATA OF AN OBJECT

CROSS-REFERENCE TO RELATED APPLICATIONS

This application is a divisional application of U.S. application Ser. No. 13/655,069 filed on Oct. 18, 2012, the contents of which are hereby incorporated by reference.

BACKGROUND

In computer graphics, three-dimensional modeling (3D) involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

The present application relates to a system including a suspension component configured to suspend an object so that the object is stationary in space, and a plurality of image capture devices configured to capture a plurality of images of the object simultaneously, substantially simultaneously, or at about the same time while the object is suspended. Each image capture device is positioned at a different location so as to capture a plurality of different views of the object. The system also includes an image processing component configured to generate a three-dimensional (3D) view of the object based on the plurality of images and the plurality of different views.

In another aspect, a system is provided. The system includes a structure configured to support an object and an actuator coupled to the structure. The actuator is configured to launch the object to a state at which vertical acceleration is balanced by gravity. The system further includes a plurality of image capture devices configured to capture a plurality of images of the object based on the object being at the state of about zero gravity the actuator being. The system also includes an image processing component configured to generate a three-dimensional (3D) view of the object based on the plurality of images.

In another embodiment, a method is provided. The method includes capturing a plurality of images of a suspended object simultaneously with a plurality of image capture devices. The plurality of image capture devices are each placed at a different location so as to capture a plurality of different views of the object. The method further includes generating a three-dimensional (3D) view of the object from the plurality of images and the plurality of different views.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 is a schematic illustrating a conceptual partial view of an example computer program product that includes a computer program for executing a computer process on a computing device, arranged according to at least some embodiments presented herein.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, systems and methods for capturing data of an object. An example system may include a suspension component for suspending an object at a so that the object is stationary in space. A plurality of image capture devices are configured to capture a plurality of images of the object simultaneously while the object is suspended. The plurality of image capture devices are each positioned at a different location so as to capture a plurality of different views of the object. The system may also include an image processing component configured to generate a three-dimensional (3D) view of the object based on the plurality of images and the plurality of different views.

Figure 1:
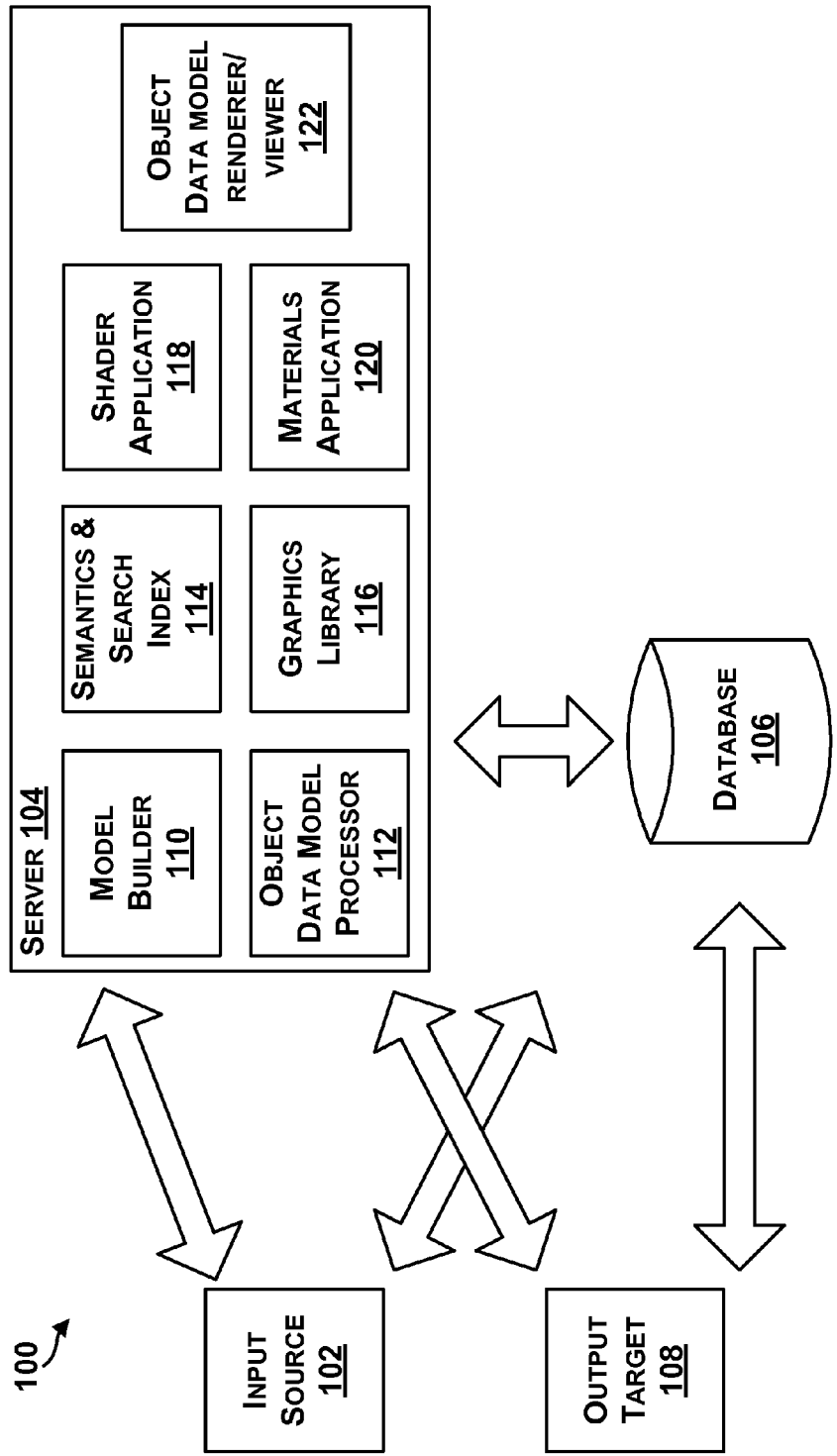
FIG. 1 illustrates an example system for object data modeling, in accordance with an embodiment.

Referring now to the figures, FIG. 1 illustrates an example system 100 for object data modeling, in accordance with an embodiment. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In another example, the systems described with respect to FIGS. 2 and 3 may be used to capture images of objects. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have vertex colors but no UV (coordinate system of a 2D texture space) unwrapping to generate a mesh D with UV mapping but no colors. As an example, for a single output texture pixel of an image processing may include, for a given point in UV determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
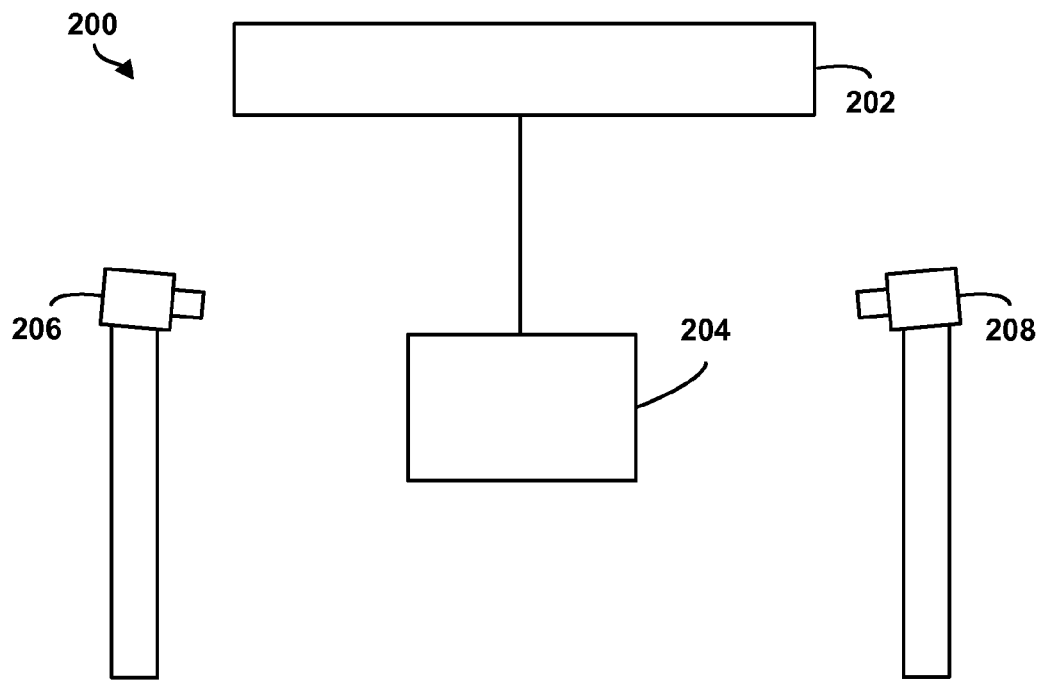
FIG. 2 illustrates an example system for capturing data of an object.

FIG. 2 illustrates an example system 200 for capturing data of an object. The system 200 may include a suspension component 202 for suspending an object 204 so as to be stationary in space. If the object is stationary in space, the object 204 has little or no net acceleration, and is approximately still (e.g., has no motion). The object 204 may be suspended in any medium, including air, liquid, or gelatin, for example. In one embodiment, the suspension component 202 may include a hook and/or string to hang the object 204 from a structure. In another example, the suspension component 202 may include any type of levitation component for suspending the object 204 by providing a physical force against gravity. For instance, the levitation component may suspend the object in a substantially stable position without solid physical contact with the object. Example levitation components may include magnetic or electromagnetic components, electrified mercury, or acoustic or optical components.

The system 200 may also include one or more image capture devices, such as a first image capture device 206 and a second image capture device 208, configured to capture a plurality of images of the object 204 while the object is suspended. The one or more image capture devices may include one or a combination of 3D scanning devices, cameras, or other types of devices capable of determining 2D or 3D information associated with the object 204 (or surfaces of the object 204). The one or more image capture device may be stationary or mobile. The object 204 may be any type of object (e.g., a shoe, purse, computer, statue, or a toy) and may be of any size.

Alternatively or additionally, the suspension component 202 may be configured to release the object 204, and the first and second image capture devices 206, 208 may be configured to capture a plurality of images of the object 204 as the object falls, or as the object moves based on the release and based on a medium in which the object is suspended.

In some embodiments, the first image capture device 206 and the second image capture device 208 are configured to capture images of the object 204 simultaneously. Each image capture device is positioned at a different location so as to capture a plurality of different views of the object 204. The first and second image capture devices 206, 208 may each be configured to capture more than one image of the object 204. Multiple images may then be merged together to create the plurality of images.

The system 200 is configured to generate a three-dimensional (3D) view of the object based on the plurality of images and the plurality of different views captured by the first and second image capture devices 206, 208. In one example, the plurality of images and views may be input to an image processing component, such as the system 100 of FIG. 1 or components of the system 100. Generally, the image processing component may be a computing device or server (not shown), that can generate a 3D view of the object by the systems and methods described above with respect to FIG. 1.

In another embodiment, the system 200 may further include one or more sensors in communication with the object 204. The one or more sensors may be configured to receive input regarding a material property of the object 204, such as color, shape, or weight, for example. The input may also be used to generate the 3D view of the object. In one example, a weight sensor may be placed near the object, such as on the suspension component 202, to detect the weight of the object 204. The weight may then be used along with the plurality of images to generate an accurate 3D view of the object 204.

Figure 3:
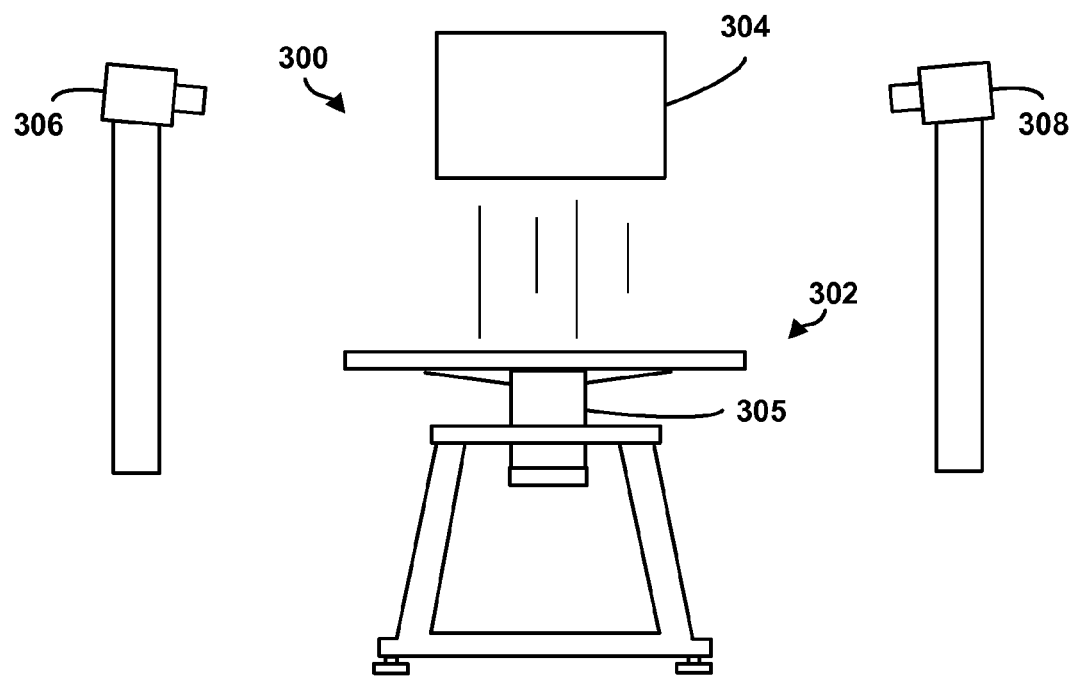
FIG. 3 illustrates another example system for capturing data of an object.

FIG. 3 illustrates another example system 300 for capturing data of an object. In some examples, the system 300 may include a structure 302 such as a platform or support for supporting an object 304. The structure 302 may be stationary or moveable, such as in the form of a conveyor belt, for example. An actuator 305 may be coupled to the structure 302. In one embodiment, the actuator 305 may be configured to project or launch the object 304 into a state of about zero net gravity. For example, the actuator 305 may project or launch the object to a state at which vertical acceleration is balanced by gravity. In one instance, a computing device (not shown) of the system may be configured to operate the actuator 305. The actuator 305 may include a motor or piston, for example. Other actuators are also possible, and in some instances, the actuator 305 may be configured to operate manually (e.g., by an operator of the system 300).

The system 300 may also include one or more image capture devices, such as a first image capture device 306 and a second image capture device 308, configured to capture a plurality of images of the object 304. The image capture devices may be similar to the first image capture device 206 and second image capture device 208 described above with respect to FIG. 2. The first and second image capture devices 306, 308 may be configured to capture images of the object 304 based on the object rising toward the state of about zero gravity, and/or based on the object falling toward the structure 302 after reaching the state of about zero gravity. Thus, the first and second image capture devices 306, 308 may capture images of the object while the object is at one or more positions after being projected into air (or another medium).

Different configurations including different components or more or less components than the systems 200 and 300 are also possible. In another example, additional image capture devices may be included. In still another example, the system may include a positioning component (not shown) capable of changing the orientation of the object 204, 304. For instance, the positioning component may be a robotic arm that is configured to lift, rotate, and lower the object to adjust an orientation of the object.

Figure 4:
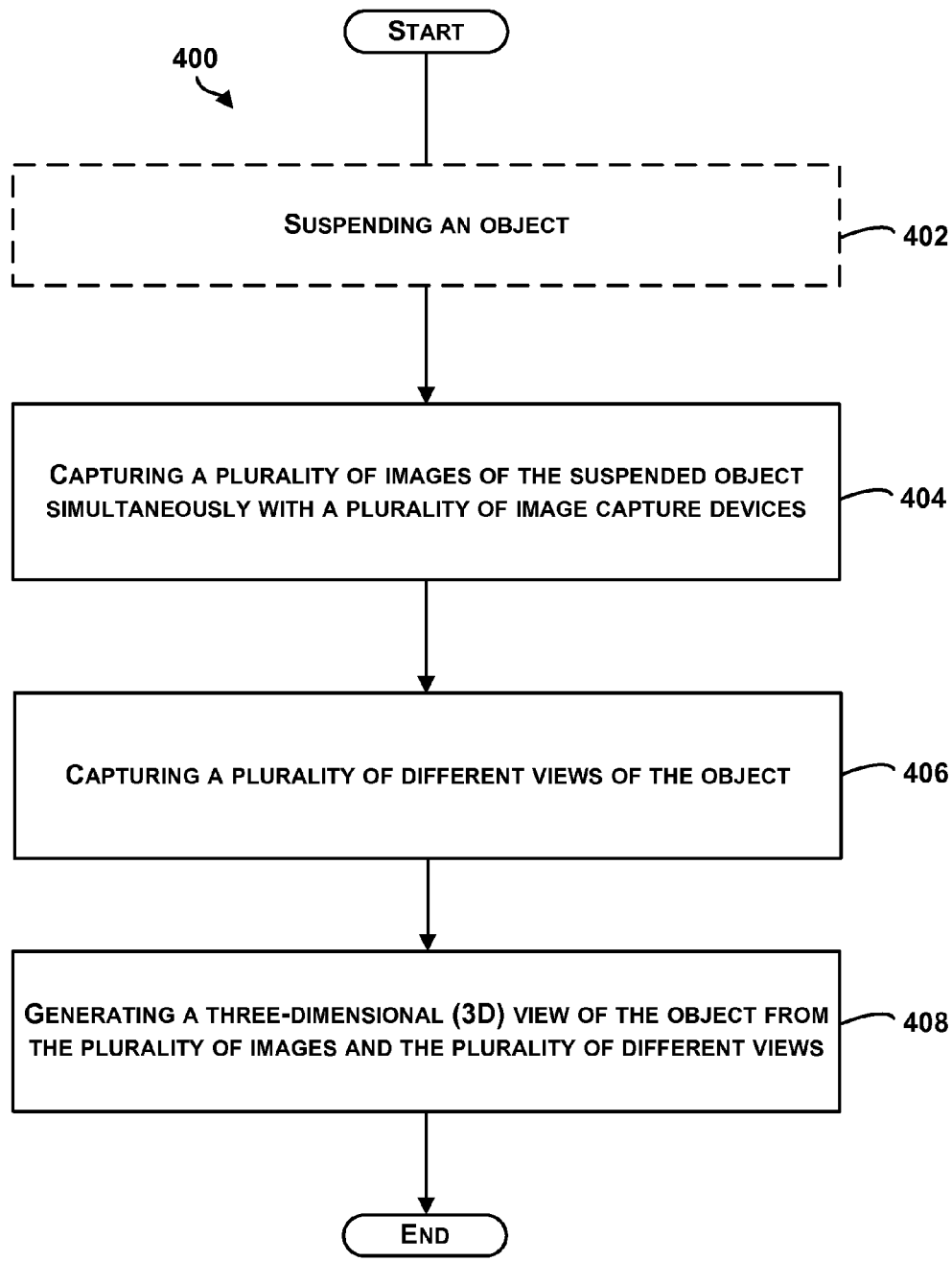
FIG. 4 is a block diagram of an example method for rendering a 3D object data model, in accordance with an embodiment.

FIG. 4 illustrates a block diagram of an example method 400 of rendering a 3D object data model, in accordance with an embodiment. The method 400 shown in FIG. 4 presents an embodiment of a method that could be used by the systems 100, 200, and 300 of FIGS. 1-3, for example.

The method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

Initially, at block 402, the method 400 includes suspending an object. As mentioned above, the object may be suspended by a suspension component, such as suspension component 202, at a point of about zero gravity, or weightlessness. At the point of zero gravity, the object has little or no acceleration, and is approximately still. The object may be suspended in any medium, including air, liquid, or gelatin, for example. The suspension component may include any type of suspension mechanism, such as hook and/or string to hang the object or any type of levitation component, for example.

At block 404, the method 400 includes capturing a plurality of images of the suspended object simultaneously with a plurality of image capture devices. As discussed above, the image capture devices may include 3D scanning devices, cameras, or other types of devices capable of determining 2D or 3D information associated with the object or surfaces of the object. The image capture devices may be stationary or mobile. The image capture devices capture images of the object simultaneously as the object is suspended at the point of about zero gravity.

At block 406, the method 400 includes capturing a plurality of different views of the object. The plurality of image capture devices may be placed at different locations so as so capture a plurality of different views of the object. As another example, the image capture devices may be moved to different locations during image capturing so as to obtain images at different locations and of different views of the object. In one embodiment, the different views may be merged together.

At block 408, the method 400 includes generating a three-dimensional (3D) view of the object from the plurality of images and the plurality of different views. For example, the plurality of images and views may be input into a computing device that can generate a 3D view of the object by the systems and methods described above with respect to FIG. 1.

In one embodiment, the object may be released from the suspension component and allowed to free-fall. The image capture devices may capture a plurality of images of the object as the object falls. Further, input regarding a rate at which the object falls or motion of the object during falling may be collected, such as by a sensor. The input may be useful in generating the 3D view of the object.

Figure 5:
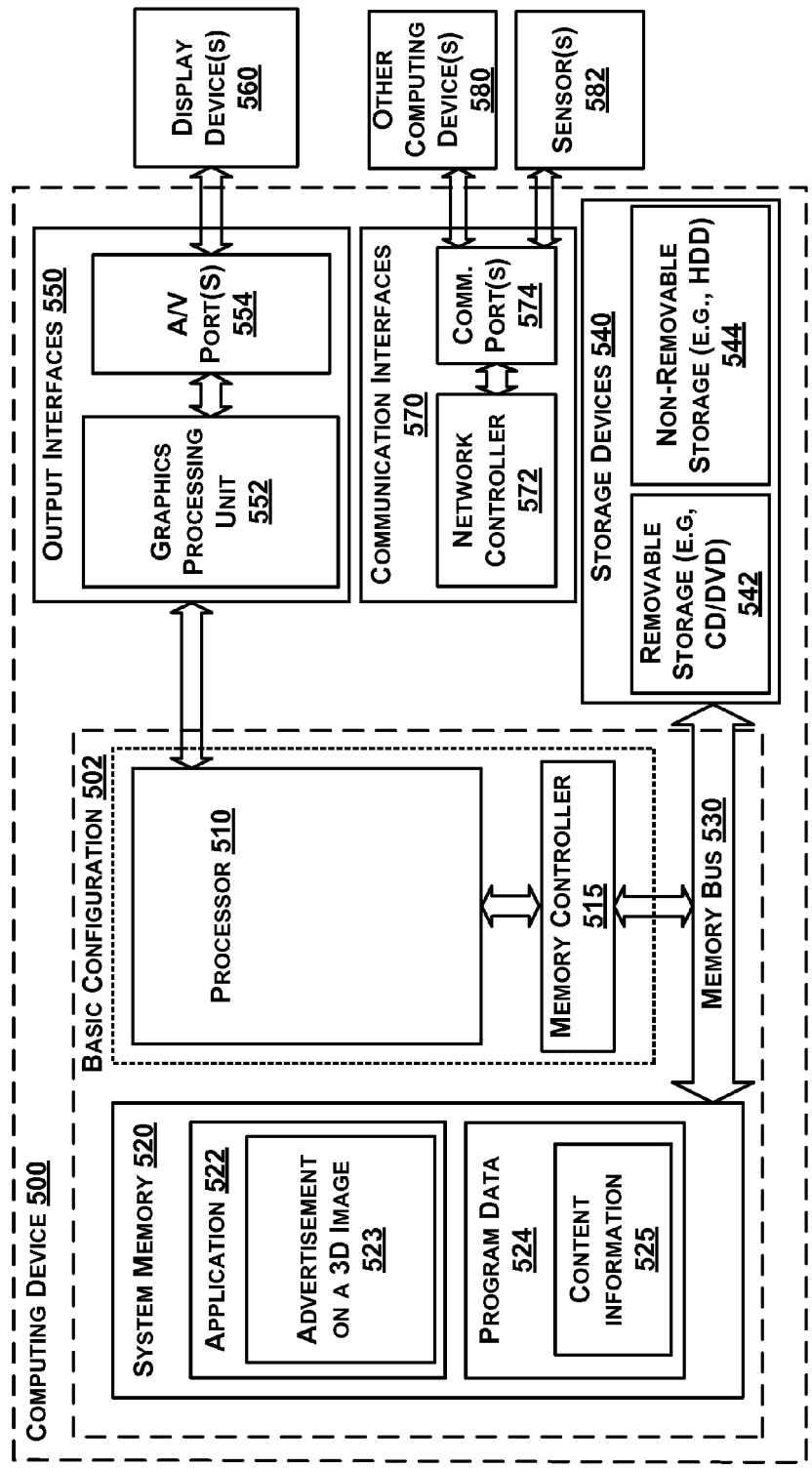
FIG. 5 is a functional block diagram illustrating an example computing device used in a computing system that is arranged in accordance with at least some embodiments described herein.

FIG. 5 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for image marking and three-dimensional (3D) image generation system as described in FIGS. 1-4. The computing device 500 may, for example, be used to implement the method 400 illustrated in FIG. 4.

In a basic configuration 502, computing device 500 may typically include one or more processors 510 and system memory 520. A memory bus 530 can be used for communicating between the processor 510 and the system memory 520. Depending on the desired configuration, processor 510 can be of any type including but not limited to a microprocessor (μP), a microcontroller (μC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include advertisement on a 3D image algorithm 523 that is arranged to provide inputs to the electronic circuits, in accordance with the present disclosure. Program data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and any devices and interfaces. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 500. Any such computer storage media can be part of the computing device 500.

The computing device 500 can also include output interfaces 550 that may include a graphics processing unit 552, which can be configured to communicate to various external devices such as display devices 560 or speakers via one or more A/V ports or a communication interface 570. The communication interface 570 may include a network controller 572, which can be arranged to facilitate communications with one or more other computing devices 580 and one or more sensors 582 over a network communication via one or more communication ports 574. The one or more sensors 582 are shown external to the computing device 500, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-5. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed, other aspects and embodiments will be apparent to those skilled in the art. The various aspects and embodiments provided in this disclosure are for purposes of illustration and are not intended to be limiting, with the true scope being indicated by the following claims, along with the full scope of equivalents to which the claims are entitled.

The invention claimed is:

1. A system comprising:
a structure configured to support an object;
an actuator coupled to the structure, the actuator being configured to launch the object to a state at which vertical acceleration is balanced by gravity;
a plurality of image capture devices configured to capture a plurality of images of the object based on the object being launched from the structure; and
an image processing component configured to generate a three-dimensional (3D) view of the object based on the plurality of images.

2. The system of claim 1 wherein the plurality of image capture devices are configured to capture a plurality of images of the object based on the object rising toward the state at which vertical acceleration is balanced by gravity.

3. The system of claim 1 wherein the plurality of image capture devices are configured to capture a plurality of images of the object based on the object falling toward the structure.

4. The system of claim 1 wherein the plurality of image capture devices are configured to capture the plurality of images simultaneously.

5. The system of claim 1 wherein the plurality of image capture devices are each placed at a different location so as to capture a plurality of different views of the object.

6. The system of claim 1 wherein the structure comprises a conveyor belt.

7. The system of claim 1 wherein the plurality of image capture devices comprise at least one two-dimensional (2D) capture device configured to capture 2D information associated with the object and at least one 3D scanning device configured to capture 3D information associated with the object.

8. A method comprising:

launching, using an actuator coupled to a structure, an object from the structure to a state at which vertical acceleration is balanced by gravity;

capturing a plurality of images of the object using a plurality of image capture devices based on the object being launched from the structure by the actuator; and generating a three-dimensional (3D) view of the object based on the plurality of images.

9. The method of claim 8 further comprising capturing a plurality of images of the object based on the object rising toward the state at which vertical acceleration is balanced by gravity.

10. The method of claim 8 further comprising capturing a plurality of images of the object based on the object falling toward the structure.

11. The method of claim 8 wherein the plurality of image capture devices are configured to capture the plurality of images simultaneously.

12. The method of claim 8 wherein the plurality of image capture devices are each placed at a different location so as to capture a plurality of different views of the object.

13. The method of claim 8 wherein the structure comprises a conveyor belt.

14. The method of claim 8 wherein the plurality of image capture devices comprise at least one two-dimensional (2D) capture device configured to capture 2D information associated with the object and at least one 3D scanning device configured to capture 3D information associated with the object.

15. A computing device, comprising:
a processor; and
a non-transitory computer-readable medium, configured to store instructions, that when executed by the processor, cause the computing device to perform functions comprising:

causing an actuator to launch an object from a structure to a state at which vertical acceleration is balanced by gravity, causing a plurality of image capture devices to capture a plurality of images of the object based on the object being launched from the structure by the actuator, and generating a three-dimensional (3D) view of the object based on the plurality of images.

16. The computing device of claim 15 wherein the functions further comprise causing the plurality of image capture devices to capture a plurality of images of the object based on the object rising toward the state at which vertical acceleration is balanced by gravity.

17. The computing device of claim 15 wherein the functions further comprise causing the plurality of image capture devices to capture a plurality of images of the object based on the object falling toward the structure.

18. The computing device of claim 15 wherein the plurality of image capture devices are each placed at a different location so as to capture a plurality of different views of the object.

19. The computing device of claim 15 wherein the plurality of image capture devices comprise at least one two-dimensional (2D) capture device configured to capture 2D information associated with the object and at least one 3D scanning device configured to capture 3D information associated with the object.

20. The computing device of claim 15, wherein the generated 3D view of the object comprises a 3D object data model having a 3D surface mesh.

* * * * *